Patented May 23, 1944

2,349,277

UNITED STATES PATENT OFFICE 2,349,277

PREPARATION OF STABILIZED EDIBLE SUBSTANCES

Kenneth C. D. Hickman, Rochester, N. Y., assignor to Distillation Products, Inc., Rochester, N. Y., a corporation of Delaware No Drawing. Application February 19, 1942, Serial No. 431,596

8 Claims. (Cl. 99—163)

This invention relates to the preparation of stabilized edible substances and particularly stabilized edible substances in refined or deodorized condition.

It is known to incorporate various antioxidants in edible substances but most antioxidants heretofore used have been of questionable value because their effect upon the animal organism was not known. In many cases it appeared that many of these substances were poisonous or had a harmful effect. Other antioxidants have been exceedingly expensive.

This invention has for its object to provide improved procedure for preparing stabilized edible substances. Another object is to provide cheap stabilized materials from new antioxidant materials. A further object is to provide a simple and economical procedure for preparing stabilized edible fats. Other objects will appear hereinafter.

These and other objects are accomplished by my invention which includes adding to the edible substance to be stabilized scum derived from the vacuum-carrier gas treatment of a vegetable or animal oil which contains tocopherol and then subjecting the mixture of edible substances and scum to deodorization treatment under vacuum.

In the following description I have given several of the preferred embodiments of my invention but it is to be understood that these are set forth for the purpose of illustration and not in limitation thereof.

The scum which is utilized in my invention is a substance which has heretofore been a waste by-product of the vegetable and animal oil (i. e. glyceride or fat) industry and particularly the vegetable and animal oil deodorization industry. This material is a complex mixture of organic compounds volatilized from the oil during deodorization and like procedures. The most common method of deodorizing vegetable and animal oils is to pass steam therethrough under reduced pressure. The steam after passing through the oil is usually condensed in a barometric condenser and the condensed steam is then permitted to flow into a sump, catch basin, or condenser discharge. The scum separates on the surface of the water in the sump or condenser and may be skimmed off. It has heretofore been the usual practice to permit it to flow into the sewer. The scum also collects on the walls of the apparatus and may be removed therefrom. Such materials are known in the deodorization art as "deodorizer hot-well sludge," "catch basin scum," "catch-all sludge," etc. It is also somewhat common procedure in the deodorizing field to place a trap between the deodorizer and the condenser, in which case the scum or its substantial equivalent is partially or completely condensed in the trap instead of entirely passing into the barometric catch basin or sump. Such material is known in the deodorizing art as "trap sludge." It is to be understood that the word scum as used herein and in the claims shall include all such matters in crude or partially refined condition produced by the methods mentioned or by an equivalent method involving the separation of the organic material volatilized during the carrier gas, vacuum treatment of vegetable and animal oils which contain tocopherol.

Useful scum can only be obtained from the foregoing procedures when applied to oils which contain tocopherol. Most of the vegetable and animal oils in their fresh and natural condition contain this material, but the vegetable oils are usually considerably richer sources and I prefer to utilize scum produced from them. Examples of particularly rich oils are corn, cottonseed and soybean. Fresh oils are preferred as a source of the scum and particularly oils which have been subjected to no treatment which would have a harmful effect upon the tocopherol. Ordinarily alkali refining decreases the tocopherol content, but oils which have been alkali refined can serve as a useful source, although a poorer one than the crude oils.

The scum as obtained usually contains about 5% to 20% water. I prefer to remove most of the water before use. However, my invention is not restricted to this expedient. The water can be removed in a simple way by merely heating the scum which causes it to separate into an oil and water layer. The oil layer can then be withdrawn or decanted and is in substantially anhydrous condition.

The scum has among other things a high content of free fatty acids and organic quinones and is very corrosive. It is thus in the very nature of things contaminated with metals, particularly iron. In many cases it is desirable to remove the metals and their soaps by a preliminary treatment with a mineral acid such as sulfuric or hydrochloric. Also reduction such as with acid and zinc dust increases the tocopherol content by converting tocopherol oxidation products back into tocopherol.

The scum in wet or dried condition is then dissolved in or thoroughly intermingled with the edible material. When the invention is applied to the preparation of stabilized fats and oils, the scum is merely dissolved in the oil in considerable amounts. Examples of oils which can be stabilized are hydrogenated oils and fats such as hydrogenated cottonseed oil, soybean, corn, olive, etc. oils. The invention is of particular value in connection with the stabilization of oils which have been subjected to a treatment which would result in a large loss of the natural antioxidants frequently contained therein. Most refining operations destroy the natural antioxidants and my invention is of particular use in stabilizing such oils and fats. When my invention is applied to the stabilization of finely ground edible substances such as wheat germ, wheat middlings, ground corn germ, etc., it is desirable that the scum be substantially evenly distributed throughout the material. This can be brought about by stirring and thorough agitation during the mixing operation. Slight heating would have no undesirable effect and would increase the rate of distribution. It is desirable, but not essential, that the scum be treated to remove water as described above.

The scum usually contains about 1% to 6% tocopherol and should be incorporated in the substance to be stabilized in amounts sufficient to give the desired stability calculated on the tocopherol content. It will be realized that the scum contains the odoriferous materials contained in the oil from which it is derived and that consequently the higher the amount of scum incorporated the more complete must be the subsequent deodorization treatment with carrier gas under vacuum. The amount of scum incorporated obviously depends upon the potency or tocopherol content of the scum, the character of the material to be stabilized, and its content of natural antioxidants. Up to about 35% of scum may be incorporated but much smaller amounts such as .001 to 10% are usually satisfactory depending of course upon the tocopherol content of the scum and the stability desired.

The mixture is then subjected to vacuum deodorization, preferably with a carrier gas. This type of deodorization treatment is well known in the deodorizing art and need not be described in detail here. Reference is made to Patents 1,713,431, 1,746,078, 1,982,593, 1,996,852, 2,078,841, 2,124,707 and 2,136,029, for typical deodorization procedures. The deodorization usually involves heating the material to a temperature of about 200° C. and passing steam therethrough which has a temperature the same as or higher than that of the heated oil. The precedure is carried out under vacuum and in the more recently improved deodorization processes the pressure is usually about 6 to 12 mm. The treatment requires several hours with batch processes but recent continuous methods result in deodorization in a shorter period of time. It is also satisfactory to deodorize the mixture under vacuum without a carrier gas as described in Patent 2,249,524—Hickman.

In connection with the solid oxygen labile substances, inert gas such as steam is passed therethrough in a heated or unheated container under reduced pressure. Steaming for ten minutes to three hours is usually sufficient.

The vacuum deodorization treatment has little or no destructive effect on the tocopherol incorporated in the mixture. However, the tocopherol is vaporizable under high vacuum conditions and the deodorization treatment should preferably be applied so that as little removal of tocopherol as possible takes place. Odoriferous materials have a substantially higher vapor pressure so that they can be preferentially removed.

While steam-vacuum deodorization constitutes the preferred embodiment of my invention, it is to be understood that other carrier gases such as hydrogen or carbon dioxide may be employed. Likewise, as mentioned, the deodorization may be accomplished by heating under relatively high vacuum without a carrier gas.

*Example 1*

Crude scum was warmed to form an aqueous and an oil layer. Two parts of the oil or scum containing 5% tocopherol were thoroughly incorporated with eighty parts of wheat middlings to yield a relatively palatable flaky mixture containing about .1% tocopherol. The mixture was then placed in a steam deodorizer and steam introduced or drawn continuously thereinto with stirring for two hours at a pressure of 55 mm. The middlings were withdrawn and were found to contain approximately .1% tocopherol and to have a good odor, and a free fatty acid content of less than .1%.

*Example 2*

20 parts of crude scum were heated to 50° C. and 100 parts of 10% HCl and 1 part of zinc dust were added with stirring. The mixture was settled for one hour and the acid layer removed. The upper layer was partly emulsified and was heated on a steam bath until the water layer separated. The oil layer was decanted, washed and filtered. It contained 4.8% tocopherol and had a peroxide value of 4.6 m. e.

This scum was then added to a sample of prime steam lard to form a mixture containing .285% scum and containing .019% tocopherol. The mixture had a bacon like odor and taste not present in the original lard. The mixture was then steam deodorized at a temperature of 220° C. at 5 mm. pressure. The final product was free of odor and taste and had good stability as shown by the following data:

| Sample | Tocopherol added in form of scum | "Swift test" [see J. Oil & Soap 10,105 (1933)] |
|---|---|---|
|  | Per cent | Hours |
| Prime steam lard | None | 3 |
| Do | .019 | 4 |
| Prime steam lard (steam deodorized) | .018 | 4 |

The deodorized mixture contained 95% of the added tocopherol.

*Example 3*

To prime steam lard was added .745% of scum prepared as described in Example 2 to give a mixture containing .03% tocopherol. This mixture was then treated with 2% of 20 Bé. sodium hydroxide at a temperature of not over 60° C. The soaps were settled out and the liquid lard mixture clarified by treatment with a neutral bleaching earth. The mixture was then steam deodorized as described in Example 2. After two hours of steaming the product was odorless and tasteless. After four hours of steaming the odor and taste were the same as at 2 hours and only 5% of the added tocopherol had been removed. The stability was improved as shown by the following data.

| Sample | Tocopherol added in form of scum | "Swift test" |
|---|---|---|
| | Per cent | Hours |
| Prime steam lard | None | 8 |
| Do | .03 | 14 |
| Prime steam lard (2 hours of steam deodorizing) | .03 | 20 |
| Prime steam lard (4 hours of steam deodorizing) | .03 | 20 |

This application is a continuation in part of my application 321,913 filed March 2, 1940, and 418,043 filed November 6, 1941.

While the main object of the invention is improvement in stability, the scum also has vitamin E activity and the invention, therefore, provides improved procedure for the preparation of new products useful as a source of vitamin E.

What I claim is:

1. The process of preparing a deodorized edible substance of improved stability which comprises adding to the edible substance, scum derived from the carrier-gas utilized for the vacuum-carrier gas deodorization treatment of a member of the group consisting of vegetable and animal glycerides which contain tocopherol and then subjecting this mixture to vaccum deodorization under conditions insufficient to volatilize a substantial amount of the tocopherol contained in the added scum.

2. The process of preparing a deodorized relatively stable edible glyceride which comprises adding to the glyceride, scum derived from the vacuum-carrier gas treatment of a member of the group consisting of vegetable and animal glycerides which contain tocopherol and subjecting the mixture of scum and glyceride to a mild deodorization treatment under vacuum and under conditions such that relatively little of the tocopherol content of the added scum is volatilized.

3. The process of preparing a deodorized relatively stable edible oil which comprises adding to the oil, scum derived from the steam utilized for the vacuum-steam deodorization treatment of a member of the group consisting of vegetable and animal oils which contain tocopherol and subjecting the mixture of scum and oil to a mild deodorization with steam under vacuum the conditions of deodorization being insufficient to volatilize a substantial amount of the tocopherol contained in the added scum.

4. The process of preparing a substantially stable solid edible substance having good odor and taste which comprises adding to the solid edible substance scum derived from the vacuum-steam deodorization treatment of a member of the group consisting of vegetable and animal oils which contain tocopherol and subjecting the mixture of scum and solid edible substance to a mild deodorization treatment with steam under vacuum, the conditions of deodorization being insufficient to volatilize a substantial amount of the tocopherol contained in the added scum.

5. As a new composition of matter of improved stability an edible substance which is labile to atmospheric oxygen and which contains a stabilizing amount of tocopherol-containing scum derived from the vacuum-carrier gas deodorization treatment of a member of the group consisting of vegetable and animal oils which contain tocopherol, said mixture of scum and edible substance being substantially free of undesirable odor and taste components of the scum.

6. As a new composition of matter an edible glyceride which is labile to atmospheric oxygen and which contains a stabilizing amount of tocopherol-containing scum derived from the vacuum-steam deodorization treatment of a tocopherol containing vegetable oil, said mixture of scum and edible glyceride being substantially free of undesirable odor and taste components of the scum which are removable by vacuum-deodorization of the same.

7. As a new composition of matter a mixture of an edible glyceride and a stabilizing amount of tocopherol-containing scum derived from the vacuum-steam deodorization treatment of a tocopherol containing vegetable oil which mixture of scum and edible glyceride is substantially free of undesirable odor and taste components of the scum which are removable by alkali-refining and steam deodorization of the mixture.

8. The process of preparing a deodorized relatively stable edible glyceride which comprises adding to the glyceride scum derived from the vacuum-steam deodorization treatment of a member of the group consisting of vegetable and animal glycerides which contain tocopherol, subjecting this mixture to an alkali-refining treatment and then subjecting it to a mild deodorization treatment under vacuum and under conditions such that relatively little of the tocopherol content of the added scum is volatilized.

KENNETH C. D. HICKMAN.